P. B. JOHNSON.
BANK CHECK.
APPLICATION FILED MAR. 19, 1915.
1,200,948.
Patented Oct. 10, 1916.
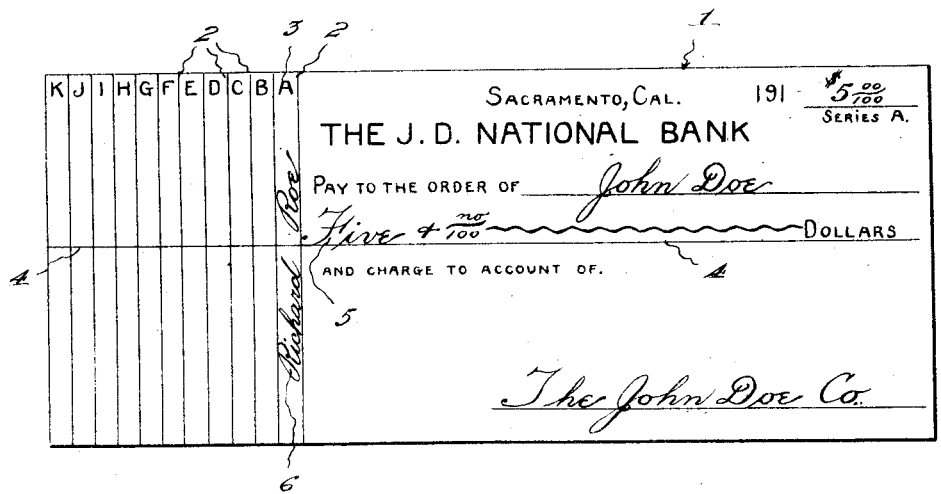
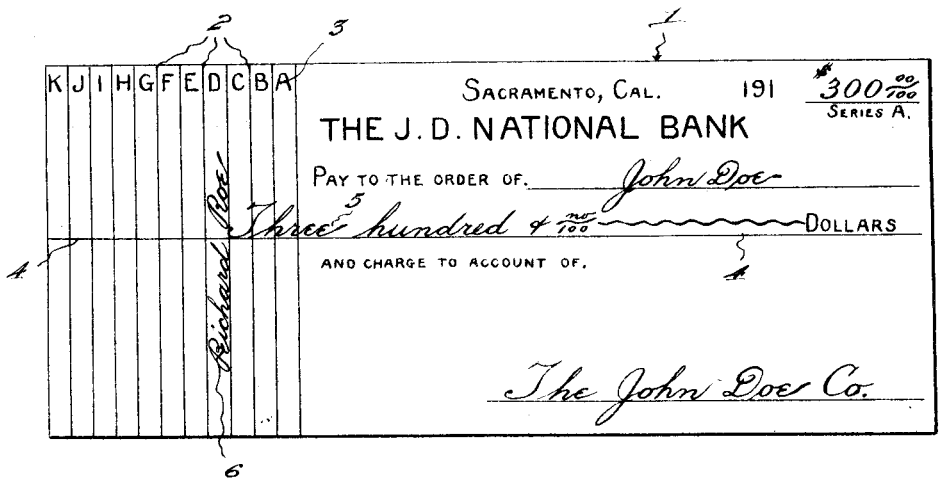
Witnesses
Inventor
P. B. Johnson.
By
Attorney

UNITED STATES PATENT OFFICE.

PRESLEY B. JOHNSON, OF SACRAMENTO, CALIFORNIA.

BANK-CHECK.

1,200,948.  Specification of Letters Patent.  Patented Oct. 10, 1916.

Application filed March 19, 1915.  Serial No. 15,497.

*To all whom it may concern:*

Be it known that I, PRESLEY B. JOHNSON, a citizen of the United States, residing at Sacramento, in the county of Sacramento and State of California, have invented certain new and useful Improvements in Bank-Checks; and I do hereby declare the following to be a full, clear, and exact description of the invention, such as will enable others skilled in the art to which it appertains to make and use the same.

This invention relates to bank checks, and one of the principal objects of the invention is to provide a check which cannot be raised or altered without discovery on the part of the paying teller.

Another object of the invention is to provide a check form in which the position of the initial letter of the amount for which the check is drawn will be indicated by its position upon the check, thus rendering it impossible to alter or raise the check without detection.

The foregoing and other objects may be attained by means of the construction illustrated in the accompany drawing, in which—

Figure 1 is a face view of a check made in accordance with this invention, and Fig. 2 is a face view of another check made out for a different amount.

Referring to the drawing, the numeral 1 designates a check as an entirety, said check having at the left-hand end thereof a series of vertical lines 2, and extending across between the lines toward the left progressively, are the first letters of the alphabet beginning with A and as shown ending with K, although any desired number of letters may be used. The letters in the horizontal column indicated by the numeral 3, are for the purpose of indicating the face value of the check when properly written. Extending centrally from right to left across the check is a line 4 which is the line upon which the amount of the check is indicated. In making out the check, the amount for which the check is to be drawn has its initial letter located in one of the vertical columns separated by the lines 2. For instance, if a check is to be drawn for five dollars, as shown in Fig. 1, the letter F indicated by the numeral 5 in Fig. 1, is to be started at the right of the first right hand vertical line 2. All checks made for companies are to be countersigned by the secretary or other officer, and as shown in Fig. 1, the signature 6 is written on the first right hand line 2.

As shown in Fig. 2 of the drawing, the signature 6 is written in the column D and since the check is made out for three hundred dollars, the initial letter T of the word "Three" begins in the column C, being the third letter of the alphabet and representing the "Three" in three hundred. It will be obvious that if the check were to be made out for five hundred dollars, the F would be started in the vertical column E and the secretary's signature would be immediately to the left of the initial letter. Where the signature appears in the column A and the check is made out for one hundred dollars or less, the check may be detached immediately to the left of the letter A. When a check is made out for two hundred dollars and the signature is in the column B the check is detached immediately to the left of the column B, and so on throughout the series. Thus each check for a larger amount is somewhat longer than checks for smaller amounts.

From the foregoing, it will be obvious that in order to alter or raise the check made in accordance with this invention, it would be necessary to erase the signature of the secretary first and then to erase the entire face value of the check in order to extend the initial letter toward the left for giving a greater amount.

From the foregoing it will be obvious that a check made in accordance with this invention cannot be altered or raised without an extraordinary amount of erasures and repreparation, and such erasures and rewriting of the check would be readily discernible owing to the fact that the vertical column lines 2 would also be obliterated.

Various changes may be made in the details of construction without departing from the spirit and scope of the invention as defined in the claim.

What is claimed is:—

A bank check having at the left hand side a series of vertical columns separated by vertical lines, letters of the alphabet commencing with A in the upper end of the right hand column and progressing in regular order toward the left to the last column, one letter for each column, and a central horizontal line for the amount of the check extending entirely across the entire check and intersecting the vertical column and lines, the vertical lines serving for the signature of the secretary of the company, and the central line extending through the check having the initial letter of the amount for which the check is drawn located in the column representing the number of dollars, and the first vertical line to the left of the said column having the amount to which the check is drawn to receive the secretary's signature, substantially as set forth.

In testimony whereof I affix my signature in presence of two witnesses.

PRESLEY B. JOHNSON.

Witnesses:
 W. C. ROBOTHAM,
 M. L. BIDWELL.